US009306919B2

(12) United States Patent
Odajima

(10) Patent No.: US 9,306,919 B2
(45) Date of Patent: Apr. 5, 2016

(54) INFORMATION PROCESSING APPARATUS, INFORMATION PROCESSING SYSTEM, INFORMATION PROCESSING METHOD, AND NON-TRANSITORY COMPUTER READABLE STORAGE MEDIUM

(71) Applicant: FUJI XEROX CO., LTD., Tokyo (JP)

(72) Inventor: Kouichi Odajima, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 102 days.

(21) Appl. No.: 13/969,919

(22) Filed: Aug. 19, 2013

(65) Prior Publication Data

US 2014/0298422 A1 Oct. 2, 2014

(30) Foreign Application Priority Data

Mar. 26, 2013 (JP) .................................. 2013-064582

(51) Int. Cl.
*H04L 29/06* (2006.01)
*H04L 9/08* (2006.01)
*H04L 12/24* (2006.01)

(52) U.S. Cl.
CPC .............. *H04L 63/06* (2013.01); *H04L 9/0833* (2013.01); *H04L 41/0806* (2013.01)

(58) Field of Classification Search
None
See application file for complete search history.

(56) References Cited

U.S. PATENT DOCUMENTS

| 2011/0252117 A1 | 10/2011 | Sng et al. |
| 2013/0014225 A1 | 1/2013 | Kageyama |
| 2014/0104638 A1* | 4/2014 | Kato ............................ 358/1.14 |

FOREIGN PATENT DOCUMENTS

| JP | 2006-018361 A | 1/2006 |
| JP | A-2007-102777 | 4/2007 |
| JP | 2007-316678 A | 12/2007 |
| JP | A-2009-237725 | 10/2009 |
| JP | A-2011-216005 | 10/2011 |
| JP | 2011-221991 A | 11/2011 |
| JP | A-2011-238036 | 11/2011 |
| JP | 2012-014434 A | 1/2012 |
| JP | 2013-015992 A | 1/2013 |

OTHER PUBLICATIONS

Sep. 1, 2015 Office Action issued in Japanese Application No. 2013-064582.

* cited by examiner

*Primary Examiner* — Hadi Armouche
*Assistant Examiner* — Andrew Steinle
(74) *Attorney, Agent, or Firm* — Oliff PLC

(57) ABSTRACT

An information processing apparatus includes a first receiving unit that receives a registration instruction to register a second information processing apparatus from a first information processing apparatus, a key generating unit that generates key information when the first receiving unit has received the registration instruction, an associating unit that associates, with the key information, registration instructing user identification information, an instruction generating unit that generates an instruction, including the key information, to cause the second information processing apparatus to communicate with the information processing apparatus, a transmitting unit that transmits the instruction to the first information processing apparatus, a second receiving unit that receives the key information and information related to registration of the second information processing apparatus, and a memory unit that stores the registration instructing user identification information in association with the information related to the registration of the second information apparatus.

6 Claims, 11 Drawing Sheets

FIG. 4

LOGIN

ACCOUNT NAME
TARO FUJI

PASSWORD
●●●●|

| ACCOUNT NAME | PASSWORD | CLIENT ID |
|---|---|---|
| TARO FUJI | **** | FFABCDE COMPANY |
| HANAKO FUJI | **** | ABCD COMPANY |

FIG. 6

| CLIENT ID | SERIAL NUMBER | DEVICE NAME | IP ADDRESS | ... |
|---|---|---|---|---|
| FFABCDE COMPANY | NL000001-000001 | AxxxxPxxx-X C0001 | 12.34.56.78 | ... |
| FFABCDE COMPANY | NL000001-000002 | AxxxxPxxx-X C0002 | 98.76.54.32 | ... |
| ABCD COMPANY | NL000001-000009 | AxxxxPxxx-X C0003 | 111.222.33.44 | ... |

FIG. 7

| CLIENT ID | TEMPORARY KEY | EXPIRATION DATE |
|---|---|---|
|  |  |  |

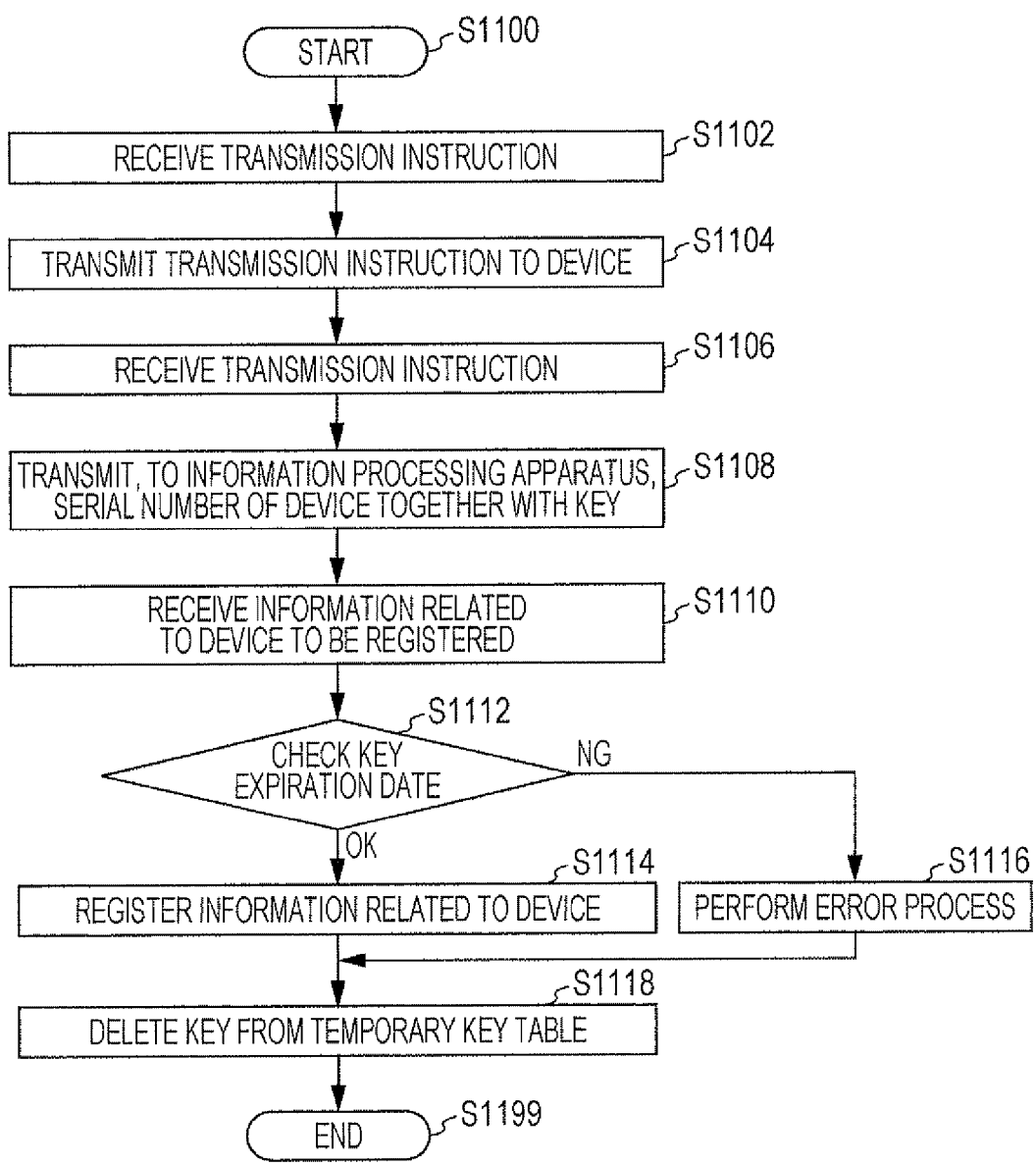

FIG. 14

| 610 | 620 | 630 | 640 | 600 |
|---|---|---|---|---|
| CLIENT ID | SERIAL NUMBER | DEVICE NAME | IP ADDRESS | ... |
| FFABCDE COMPANY | NL000001-000001 | AxxxxPxxx-X C0001 | 12.34.56.78 | ... |
| FFABCDE COMPANY | NL000001-000002 | AxxxxPxxx-X C0002 | 98.76.54.32 | ... |
| ABCD COMPANY | NL000001-000009 | AxxxxPxxx-X C0003 | 111.222.33.44 | ... |
| FFABCDE COMPANY | NL000001-000003 | AxxxxPxxx-X C0003 | 127.0.0.1 | |

FIG. 15

| 710 | 720 | 730 | 700 |
|---|---|---|---|
| CLIENT ID | TEMPORARY KEY | EXPIRATION DATE | |
| | | | |

INFORMATION PROCESSING APPARATUS, INFORMATION PROCESSING SYSTEM, INFORMATION PROCESSING METHOD, AND NON-TRANSITORY COMPUTER READABLE STORAGE MEDIUM

CROSS-REFERENCE TO RELATED APPLICATIONS

This application is based on and claims priority under 35 USC 119 from Japanese Patent Application No. 2013-064582 filed Mar. 26, 2013.

BACKGROUND

Technical Field

The present invention relates to an information processing apparatus, an information processing system, an information processing method, and a non-transitory computer readable storage medium.

SUMMARY

According to an aspect of the invention, there is provided an information processing apparatus. The information processing apparatus includes a first receiving unit that receives a registration instruction to register a second information processing apparatus from a first information processing apparatus, a key generating unit that generates key information when the first receiving unit has received the registration instruction, an associating unit that associates, with the key information, registration instructing user identification information that identifies a user who has given the registration instruction, an instruction generating unit that generates an instruction, including the key information, to cause the second information processing apparatus to communicate with the information processing apparatus, a transmitting unit that transmits the instruction to the first information processing apparatus, a second receiving unit that receives the key information and information related to registration of the second information processing apparatus from the second information processing apparatus in response to the instruction, and a memory unit that stores, in accordance with the key information received by the second receiving unit, the registration instructing user identification information in association with the information related to the registration of the second information apparatus received by the second receiving unit.

BRIEF DESCRIPTION OF THE DRAWINGS

Exemplary embodiment of the present invention will be described in detail based on the following figures, wherein:

FIG. 4 illustrates a display example of a login screen;

FIG. 5 illustrates an example of the data structure of a login information table;

FIG. 6 illustrates an example of the data structure of a device information table;

FIG. 7 illustrates an example of the data structure of a temporary key table;

FIG. 10 illustrates an example of the data structure of the temporary key table;

FIG. 11 is a flowchart illustrating a process example of the exemplary embodiment;

FIG. 14 illustrates an example of the data structure of the device information table;

FIG. 15 illustrates an example of the data structure of the temporary key table;

DETAILED DESCRIPTION

An exemplary embodiment of the present invention is described below with reference to the drawings.

Figure 1:
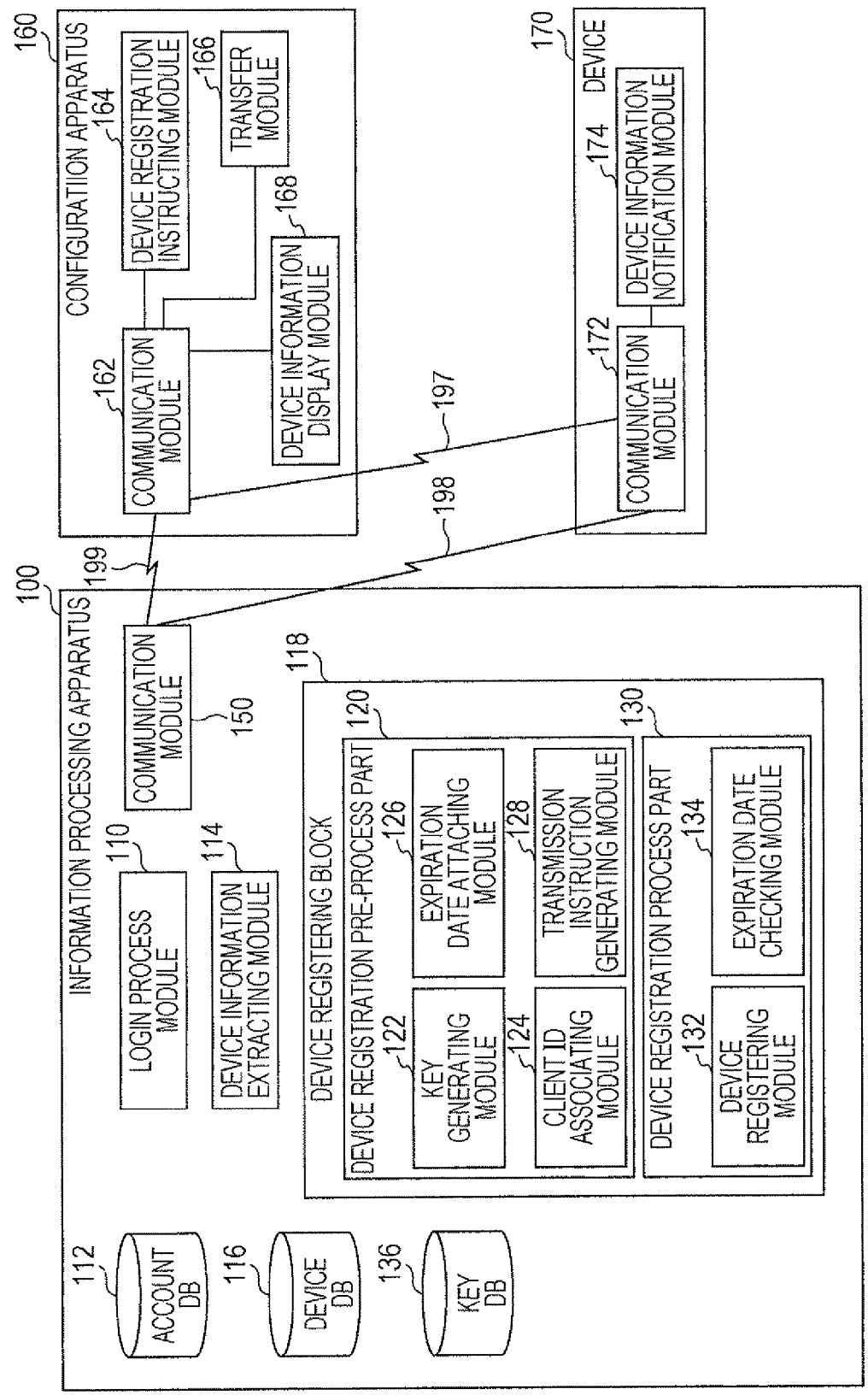
FIG. 1 is a schematic module diagram illustrating a configuration of an exemplary embodiment.

FIG. 1 is a schematic module diagram illustrating a configuration of the exemplary embodiment. The term module refers to a software component that is logically separable (a computer program or simply a program), or a hardware component. The module of the exemplary embodiment refers to not only a module in a computer program but also a module in a hardware structure. The discussion of the exemplary embodiment also serves as the discussion of computer programs for causing the modules to function (including a program that causes a computer to execute each step, a program that causes the computer to function as an element, and a program that causes the computer to implement each function), a system and a method. In the discussion that follows, the phrases "stores information," "causes information to be stored," and other phrases equivalent thereto are used. If the exemplary embodiment is a computer program, these phrases are intended to express "causes a memory device to store information" or "controls a memory device to cause the memory device to store information." The modules may correspond to the functions in a one-to-one correspondence. In a software implementation, one module may be composed of one program or multiple modules may be composed of one program. One module may be composed of multiple programs. Multiple modules may be executed by a single computer. A single module may be executed by multiple computers in a distributed environment or a parallel environment. One module may include another module. In the discussion that follows, the term "connection" refers to not only a physical connection but also a logical connection (such as an exchange of data, instructions, and data reference relationship). The term "predetermined" means that something is decided in advance of a process of interest. The term "predetermined" is thus intended to refer to something that is decided in advance of a process of interest in the exemplary embodiment. Even after a process in the exemplary embodiment has started, the term "predetermined" refers to something that is decided in advance of a process of interest depending on a condition or a status of the exemplary embodiment at the present point of time or depending on a condition or status heretofore continuing down to the present point of time. If "predetermined values" are plural, the predetermined values may be different from each other, or two or more of the predetermined values (including all the values) may be equal to each other. A statement that "if A, B is to be performed" is intended to mean that it is determined whether something is A, and that if something is determined as A, an action B is carried out. The statement becomes meaningless if the determination as to whether something is A is not performed.

The term "system" and the term "apparatus" refer to an arrangement where multiple computers, a hardware structure, and an apparatus are interconnected via a communication network (including a one-to-one communication connection). The term "system" and the term "apparatus" also refer to an arrangement that includes a single computer, a hardware structure, and an apparatus. The term "system" and the term "apparatus" have the same definition and are interchangeable with each other. The system in the context of the exemplary embodiment does not include a social system that is a social arrangement formulated by humans.

At each process performed by a module, or at one of the processes performed by a module, information as a process target is read from a memory device, the information is then processed, and the process results are written onto the memory device. A description related to the reading of the information from the memory device prior to the process and the writing of the processed information onto the memory device subsequent to the process may be omitted as appropriate. The memory devices may include a hard disc, a random-access memory (RAM), an external storage medium, a memory device connected via a communication network, and a register within a central processing unit (CPU).

Referring to an example of FIG. 1, an information processing apparatus 100 of an exemplary embodiment includes a login process module 110, an account database (DB) 112, a device information extracting module 114, a device DB 116, a device registering block 118, a key DB 136, and a communication module 150. The device registering block 118 includes a device registration pre-process part 120 and a device registration process part 130. The information processing apparatus 100 is connected to a configuration apparatus 160 via a communication network 199, and to a device 170 via a communication network 198. The configuration apparatus 160 is connected to the device 170 via a communication network 197.

A firewall may be located in each of the communication network 198 and the communication network 199. If the firewall is located, the configuration apparatus 160 and the device 170 are located inside the respective firewalls, and the information processing apparatus 100 is located outside the firewalls. The configuration apparatus 160 and the device 170 may be located in an in-firm intranet, for example. Communications from the configuration apparatus 160 and the device 170 to the information processing apparatus 100 outside the firewall may be performed at any timing, but communications from the information processing apparatus 100 to one of the configuration apparatus 160 and the device 170 are not performed at any timing. When the configuration apparatus 160 accesses the information processing apparatus 100 for communications, the information processing apparatus 100 is permitted to reply to the configuration apparatus 160. When the device 170 accesses the information processing apparatus 100 for communications, the information processing apparatus 100 is permitted to reply to the device 170.

Upon receiving from the configuration apparatus 160 a registration instruction to register the device 170, the information processing apparatus 100 registers the device 170 in accordance with a communication from the device 170.

The device 170 performs an information process including an image process, and may be an image processing apparatus or a personal computer (PC). The image processing apparatus may be a photocopying machine, a facsimile machine, a scanner, a printer, or a multi-function apparatus (such as an image processing apparatus having at least two functions of a scanner, a printer, a photocopying machine, and a facsimile machine). Plural devices 170 may be connected to the information processing apparatus 100.

The configuration apparatus 160 instructs the information processing apparatus 100 to register the device 170. Plural apparatuses 160 may be connected to the information processing apparatus 100.

The device 170 located at a client location may be centrally managed by the information processing apparatus 100 that serves as a central server. Since a firewall is typically located at the client location, the information processing apparatus 100 is unable to directly commence communications with the device 170. For this reason, the device 170 periodically commences communications with the information processing apparatus 100 (in polling communications).

In such a case, the information processing apparatus 100 provides a Web service that manages the device 170. In the Web service, a client may add the device 170 located in a client local net under the management of the Web service.

The method disclosed in Japanese Unexamined Patent Application Publication No. 2009-237725 implements the Web service that manages a multi-function apparatus corresponding to the device 170 over the cloud, for example.

Newly adding the multi-function apparatus under the management of the service is difficult under an environment where a Web server provides the service to multiple clients over the cloud. More specifically, a polling communication may be received from the multi-function apparatus that is not yet placed under the management of the service. With the technique of the polling communication, it is difficult to obtain information linking the multi-function apparatus to a client having the multi-function apparatus under the client's management.

In the method which requests the client (an operator of the Web) to enter a serial number, the server side corresponding to the information processing apparatus 100 has no way of detecting an input error of the serial number. The problem thus arises that a multi-function apparatus of another client is erroneously placed under management.

In another contemplated method, a particular application may be installed to add a multi-function apparatus under the service management on a client PC corresponding to the configuration apparatus 160. Installing the application on the client PC is a complex job, and becomes a burden on the administrator. In yet another method, an administrator (client) may directly enter on the device 170 association (linking) information to transmit the association information to the information processing apparatus 100. With this method, however, the administrator is obliged to operate each device to enter the association (linking) information if plural devices 170 are employed. This operation becomes a burden on the administrator, and further there is a possibility of input error.

Under these circumstances, in order to newly add a multi-function apparatus, the administrator has typically input the association (linking) information that associates the multi-function apparatus with the client in accordance with a contract with the client. The inputting by the operation administrator causes a time lag between an addition request from the client and the actual inputting. It is thus difficult to immediately provide the service in response to the request from the client.

The process of the exemplary embodiment is summarized as below.

The information processing apparatus 100 as a server issues a temporary key in a cloud Web service upon receiving an instruction to register the device 170, such as a multi-function apparatus, from the configuration apparatus 160 in response to an operation of a client. The temporary key is transmitted to the device 170 via a browser in the configuration apparatus 160 of the client using JavaScript object node with padding (JSONP) or the like. The device 170 performs temporary communications different from standard communications, thereby transmitting the temporary key to the information processing apparatus 100. Upon receiving the temporary key, the information processing apparatus 100 associates the client with the multi-function apparatus using the temporary key. The standard communication refers to a communication from the device 170 to the information processing apparatus 100, and is typically a polling communication along which a status report of the device 170 is periodically performed. The temporary communication is simply different from the standard communication, and may be an immediate communication that is performed in time of need.

The configuration apparatus 160 includes a communication module 162, a device registration instructing module 164, a transfer module 166, and a device information display module 168.

The communication module 162 is connected to the device registration instructing module 164, the transfer module 166, and the device information display module 168. The communication module 162 is also connected to the communication module 150 in the information processing apparatus 100 via the communication network 199, and to the communication module 172 in the device 170 via the communication network 197. The communication module 162 communicates with the information processing apparatus 100 and the device 170. The communication module 162 transmits to the information processing apparatus 100 a registration instruction from the device registration instructing module 164 (an instruction to register the device 170 on the information processing apparatus 100), receives a communication from the information processing apparatus 100, and relays the communication to the transfer module 166. The communication module 162 transmits information from the transfer module 166 to the device 170.

The device registration instructing module 164 is connected to the communication module 162. The device registration instructing module 164 transmits the registration instruction of the device 170 to the information processing apparatus 100. For example, the device registration instructing module 164 transmits to the information processing apparatus 100 the registration instruction so that the information processing apparatus 100 manages a newly located device 170. The registration instruction is generated by an operation performed by an operator (for example, an administrator of the client). The registration instruction generated in response to the operation performed by the operator is described below with reference to FIG. 9.

The transfer module 166 is connected to the communication module 162. Upon receiving an instruction from the information processing apparatus 100, the transfer module 166 transfers the instruction to the device 170 in response to the instruction. For example, if a transfer instruction, such as "an instruction to perform a communication from the device 170 to the information processing apparatus 100" is received from the information processing apparatus 100, the transfer module 166 transmits the instruction to the device 170. The instruction contains key information generated by the information processing apparatus 100.

The device information display module 168 is connected to the communication module 162. In response to an instruction of the operator, the device information display module 168 communicates with the information processing apparatus 100, and displays a configuration screen 800 of FIG. 8 to be discussed below on a screen of the configuration apparatus 160.

The device 170 includes the communication module 172 and a device information notification module 174.

The communication module 172 is connected to the device information notification module 174. The communication module 172 is also connected to the communication module 150 in the information processing apparatus 100 via the communication network 198, and to the communication module 162 in the configuration apparatus 160 via the communication network 197. The communication module 172 receives a communication from the configuration apparatus 160, and then relays the communication to the device information notification module 174. The communication module 172 transmits information from the device information notification module 174 to the information processing apparatus 100, and receives a communication from the information processing apparatus 100, and then relays the communication to the device information notification module 174.

The device information notification module 174 is connected to the communication module 172. Upon receiving an instruction from the configuration apparatus 160, the device information notification module 174 transmits to the information processing apparatus 100 key information contained in the instruction and information related to the registration of the device 170 in response to the instruction. For example, upon receiving from the configuration apparatus 160 an "instruction to perform a communication from the device 170 to the information processing apparatus 100", the device information notification module 174 transmits to the information processing apparatus 100 the key information, a serial number of the device 170 (information that uniquely identifies the device 170 in the exemplary embodiment), a name of the device 170, an IP address of the device 170, and the like in accordance with the instruction.

The communication module 150 in the information processing apparatus 100 is connected to the communication module 162 in the configuration apparatus 160 via the communication network 199, and to the communication module 172 in the device 170 via the communication network 198. The communication module 150 communicates with the configuration apparatus 160 and the device 170. Upon receiving a communication from the configuration apparatus 160, the communication module 150 relays the communication to the login process module 110, the device information extracting module 114, and the device registering block 118. The communication module 150 transmits information from each of the login process module 110, the device information extracting module 114, and the device registering block 118 to the configuration apparatus 160. Upon receiving a communication from the device 170, the communication module 150 relays the communication to the device registering block 118 while transmitting information from the device registering block 118 to the device 170.

In accordance with a communication from the configuration apparatus 160, the login process module 110 determines whether an operator of the configuration apparatus 160 is authorized to perform a process of the information processing apparatus 100. For example, the login process module 110 causes a login screen 400 of FIG. 4 to be displayed on a device information table 600, and then performs a login process using information on the account DB 112.

The account DB 112 stores information that is used to manage users who may perform a process of the information processing apparatus 100. For example, the account DB 112 stores a login information table 500 of FIG. 5 to be discussed later.

The device information extracting module 114 generates a list of devices 170 managed by client IDs through the communication from the configuration apparatus 160, and then transmits the generated list to the configuration apparatus 160.

The device DB 116 stores the client ID and information that is used to manage the device 170 located at the client identified by the client ID. For example, the device DB 116 stores a device information table 600 of FIG. 6 to be discussed below.

The key DB 136 stores association between the client ID and the key information. An expiration date may be associated with the key information. For example, the key DB 136 may store a temporary key table 700 of FIG. 7 to be discussed below.

The device registering block 118 performs a process to register on the device DB 116 a device 170 newly located at the client.

The device registering block 118 includes a device registration pre-process part 120 and a device registration process part 130. The device registration pre-process part 120 communicates with the configuration apparatus 160 and performs a pre-process to register the device 170.

The device registration pre-process part 120 includes a key generating module 122, a client ID associating module 124, an expiration date attaching module 126, and a transmission instruction generating module 128.

The key generating module 122 receives an registration instruction of a second information processing apparatus from a first information processing apparatus. Upon receiving the registration instruction, the key generating module 122 generates key information. The key information here is information that simply associates the client with the device 170 to be registered. More desirably, the same key information is designed so as not to be used by plural times, or the key information is information that is difficult for a third party to guess. For example, the key information may be a random number or may be a so-called one-time password.

The client ID associating module 124 associates the key information with registration instructing user identification information (hereinafter referred to as a client ID) that identifies a user who has given the registration instruction. For example, the client ID associating module 124 generates a temporary key table 700 of FIG. 10 to be discussed below (a client ID column 710, and a temporary key column 720), and causes the key DB 136 to store the temporary key table 700. The registration instructing user identification information may identify a user who has given the registration instruction or a group or organization (legal entity) to which the user belongs to. For example, the registration instructing user identification information may be the client ID in the exemplary embodiment.

The expiration date attaching module 126 attaches to the key information the expiration date of the key information generated by the key generating module 122. For example, the expiration date attaching module 126 generates the temporary key table 700 of FIG. 10 to be discussed below (an expiration date column 730 corresponding to the client ID column 710), and causes the key DB 136 to store the temporary key table 700.

The transmission instruction generating module 128 generates an instruction containing the key information. The instruction is to cause the device 170 as a target of a registration to perform communications with the information processing apparatus 100. The transmission instruction generating module 128 transmits the instruction to the configuration apparatus 160 via the communication module 150 and the communication network 199. The direct transmission of the instruction to the device 170 is difficult if the firewall is present between the login process module 110 and the device 170.

After the device registration pre-process part 120 completes the process thereof, the device registration process part 130 registers the device 170 in response to the communication from the device 170.

The device registration process part 130 includes a device registering module 132 and an expiration date checking module 134.

Through the communication from the device 170 responsive to the instruction, the device registering module 132 receives the key information and the information related to the registration of the device 170. In response to the received key information, the device registering module 132 stores the registration instructing user identification information in association with the information related to the registration of the device 170 on the device DB 116. Alternatively, the device registering module 132 may store on the device DB 116 the information related to the registration of the device 170 in accordance with the registration instructing user identification information associated with the received key information by the client ID associating module 124. Upon determining that the key information has not expired yet, the device registering module 132 may register the information related to the registration of the device 170. If the search by the expiration date checking module 134 determines that the key information has not expired yet, the device registering module 132 may register the information related to the registration of the device 170. Upon determining that the key information has expired, the device registering module 132 performs an error process such as displaying an error message.

The expiration date checking module 134 checks the expiration date attached to the key information received by the device registering module 132. More specifically, the expiration date checking module 134 checks the validity of the key information by determining whether the present time and day is before the expiration date.

Figure 2:
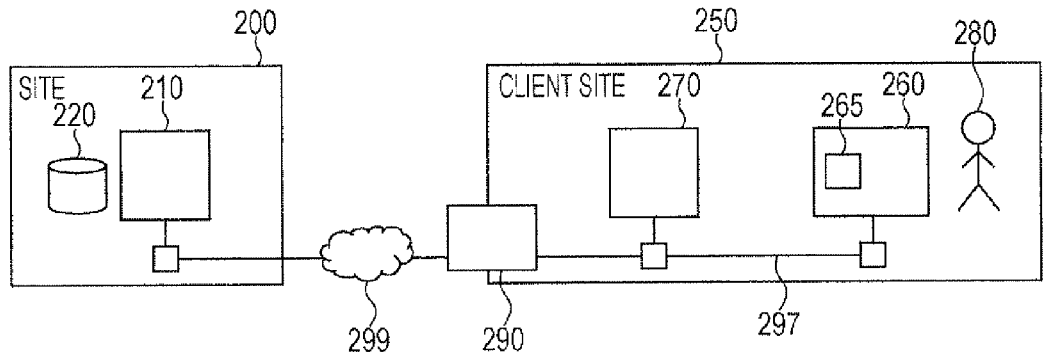
FIG. 2 illustrates a system configuration of the exemplary embodiment.

FIG. 2 illustrates a system configuration of the system of the exemplary embodiment.

A site 200 includes a center 210 and a database 220. The center 210 and the database 220 form a cloud platform. A client site 250 includes a client personal computer (PC) 260 and a device 270. The client PC 260 is operated by an operator 280. The center 210 in the site 200 is connected to the client PC 260 and the device 270 in the client site 250 via the Internet 299. A communication to or from the client site 250 may be performed via a firewall 290. The client PC 260 and the device 270 may communicate with each other via a communication network 297 in the client site 250. In other words, the client PC 260 and the device 270 may communicate with each other without being via the firewall 290. The device 270 remains communicable with the center 210 (via a communication scheme including the temporary communication and the polling communication). A digital certificate is located on the device 270. The communication of the device 270 with the center 210 may be encrypted using the digital certificate.

The center 210 and the database 220 correspond to the information processing apparatus 100 of FIG. 1. The database 220 corresponds to the account DB 112, the device DB 116, and the key DB 136 illustrated in FIG. 1. The device 270 corresponds to the device 170 of FIG. 1. The client PC 260 corresponds to the configuration apparatus 160 of FIG. 1. The communication network 297 corresponds to the communication network 197 of FIG. 1. The client PC 260 includes an Internet browser 265. Using the Internet browser 265, the operator 280 performs operations, including displaying a list of the devices 270 present in the client site 250, and instructing a newly located device 270 to be registered.

The database 220 stores network information or the like of the device 270 in the client site 250. The center 210 has a Web server function and a function to respond to a communication originated at the device 270. In response to a registration instruction from the client PC 260, the center 210 transmits control information "to transmit to the device 270 a request to start a communication to the center 210" (the control information corresponds to "the instruction to perform the communication from the device 170 to the information processing apparatus 100" described above). More specifically, "to transmit to the device 270 the request to start the communication to the center 210" corresponds to JSONP, and "the control information 'to transmit to the device 270 the request to start the communication to the center 210'" corresponds to JavaScript (registered trademark). The center 210 uses the key information in order to determine whether the communication from the device 170 is responsive to the registration instruction of the configuration apparatus 160.

The client PC 260 requests the center 210 to transmit the control information "to transmit to the device 270 the request to start the communication to the center 210". More specifically, if a button on a Web page provided by the center 210 and displayed by the Internet browser 265 (such as an OK button 920 of FIG. 9 to be discussed below) is clicked, the client PC 260 transmits the registration instruction to the center 210. The client PC 260 interprets and executes the control information that is transmitted from the center 210 in response to the registration instruction. For example, the Internet browser 265 executes JavaScript (registered trademark), thereby transferring to the device 270 the key information and an instruction from the center 210.

The device 270 commences a communication to the center 210 in response to the transfer from the client PC 260. Specifically, the device 270 is enabled to receive a JSONP request. More specifically, the device 270 becomes a hypertext transfer protocol (HTTP) server that responds to a specific URL. If there is an access to the specific URL, the device 270 commences the communication to the center 210.

Figure 3:
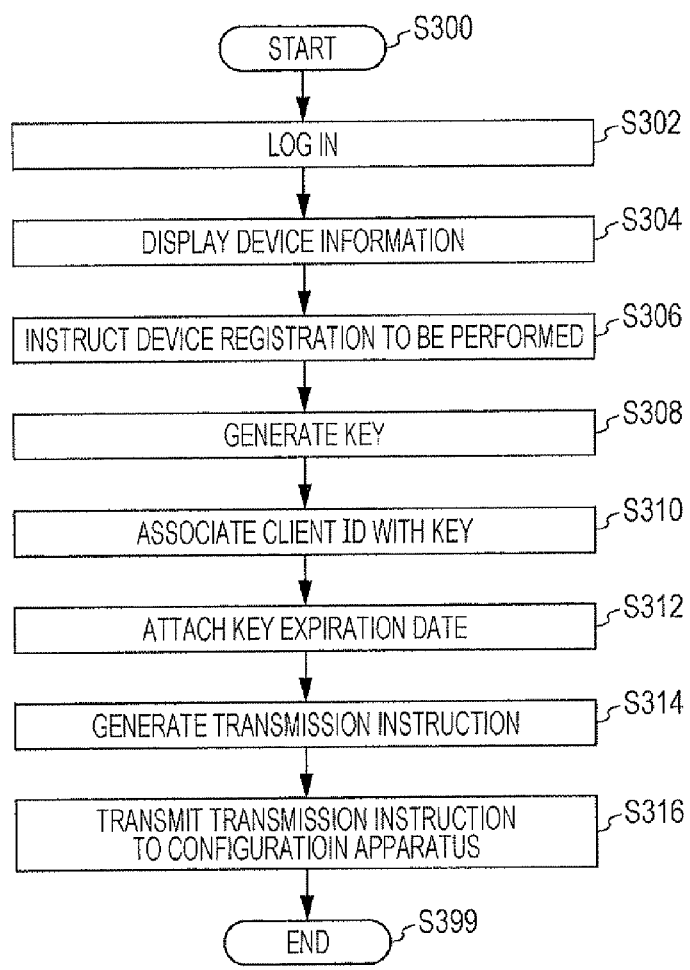
FIG. 3 is a flowchart illustrating an example of a process of the exemplary embodiment.

FIG. 3 is a flowchart illustrating an example of the process of the exemplary embodiment.

In step S302, the login process module 110 performs a login operation. For example, the operator 280 accesses a Web site that the center 210 in the site 200 provides using the Internet browser 265 in the client PC 260 in the client site 250. The login process module 110 causes a display of the configuration apparatus 160 to display a login screen 400 of FIG. 4. FIG. 4 illustrates an example of the login screen 400. The login screen 400 includes an account name box 410, a password box 420, and an OK button 430. An account name of the operator 280 is entered in the account name box 410. The password box 420 corresponds to the account name, and a password is entered in the password box 420 to allow the operator 280 to use the information processing apparatus 100.

If the OK button 430 is selected, the information entered in the account name box 410 and the password box 420 is transmitted to the information processing apparatus 100. The login process module 110 in the information processing apparatus 100 references the login information table 500 in the account DB 112, thereby obtaining an association (link) of a client ID from the input account information. An account name "Taro FUJI" is entered herein, and a password is checked. If the password is correct, a client ID "FFABCDE Company" is obtained. FIG. 5 illustrates an example of the data structure of the login information table 500. The login information table 500 includes an account name column 510, a password column 520, and a client ID column 530. The account name column 510 stores an account name. The password column 520 stores a password corresponding to the account name. The client ID column 530 stores a client ID corresponding to the account name. The client IC column stores the client ID corresponding to the account name. The client ID herein is a legal entity to which the operator 280 belongs. Alternatively, the client ID may be the account name itself.

In step S304, the device information extracting module 114 performs a device information display process. The device information extracting module 114 references the device information table 600 in the device DB 116 to obtain information of a device that the client performing the login operation manages. Specifically, the device information extracting module 114 obtains information of serial numbers "NL000001-000001" and "NL000001-000002" for two apparatuses in accordance with the client ID of "FFABCDE Company". The device information extracting module 114 transmits to the configuration apparatus 160 information that is derived from the obtained information about the devices 170 to display a Web page on the configuration apparatus 160. The Web page is used to provide service to manage the devices 170. FIG. 6 illustrates an example of the data structure of the device information table 600. The device information table 600 includes a client ID column 610, a serial number column 620, a device name column 630, an IP address column 640, and the like. The client ID column 610 stores a client ID. The serial number column 620 stores a serial number identifying a device 170. The device name column 630 stores a name of the device 170. The ID address column 640 stores an IP address of the device 170. The device information table 600 may further store use information representing a usage status (number of printouts).

Figure 8:
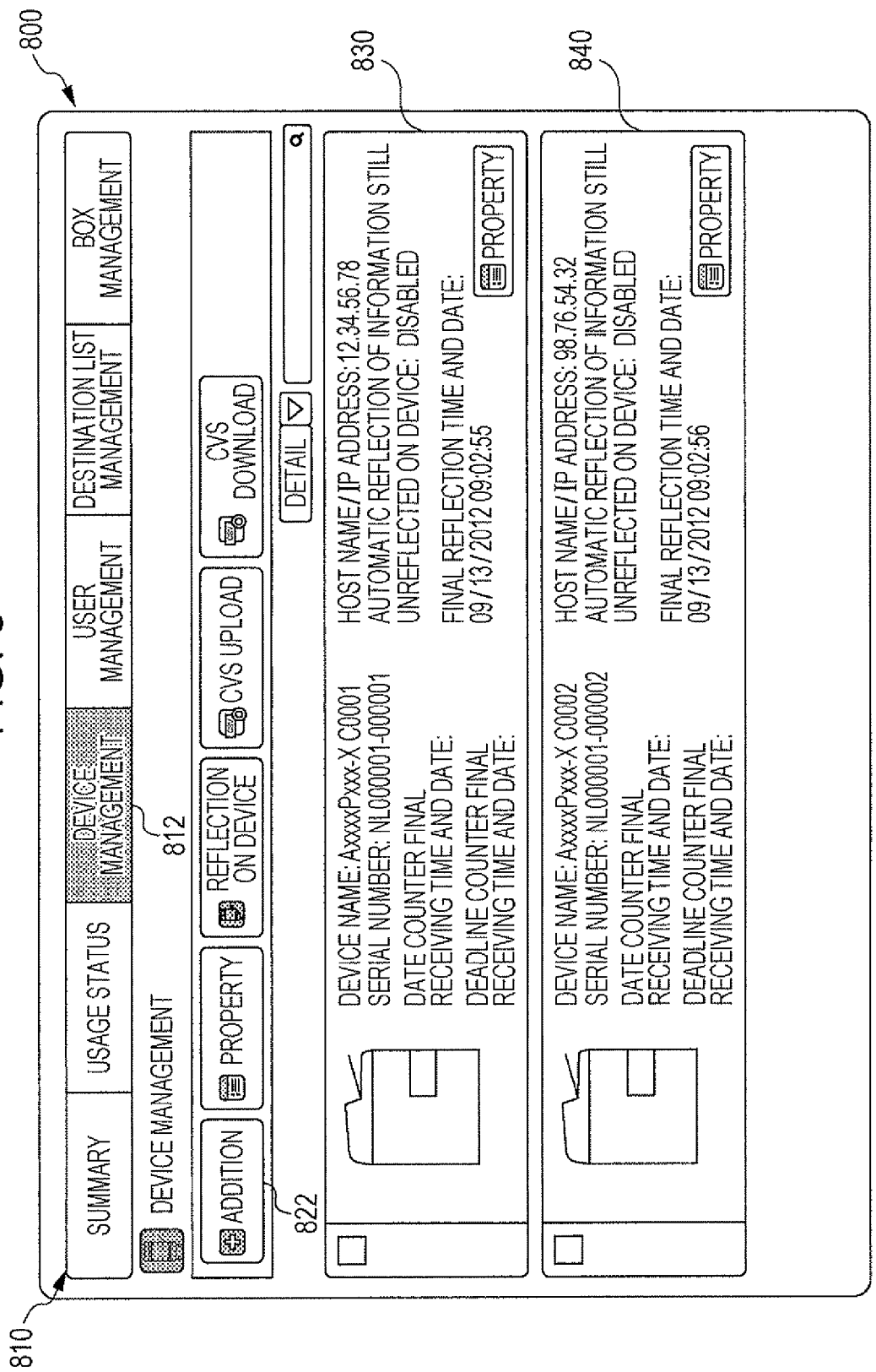
FIG. 8 illustrates a display example of a configuration screen.

A Web page to provide service that manages the device 170 may be a configuration screen 800 of FIG. 8, for example. FIG. 8 illustrates a display example of the configuration screen 800. The configuration screen 800 includes a menu partition 810, an addition button 822, a device status information display partition 830, and a device status information display partition 840. The menu partition 810 includes a device management button 812 and the like. If the device management button 812 is selected, the device status information display partition 830 and the device status information display partition 840 are displayed.

Figure 9:
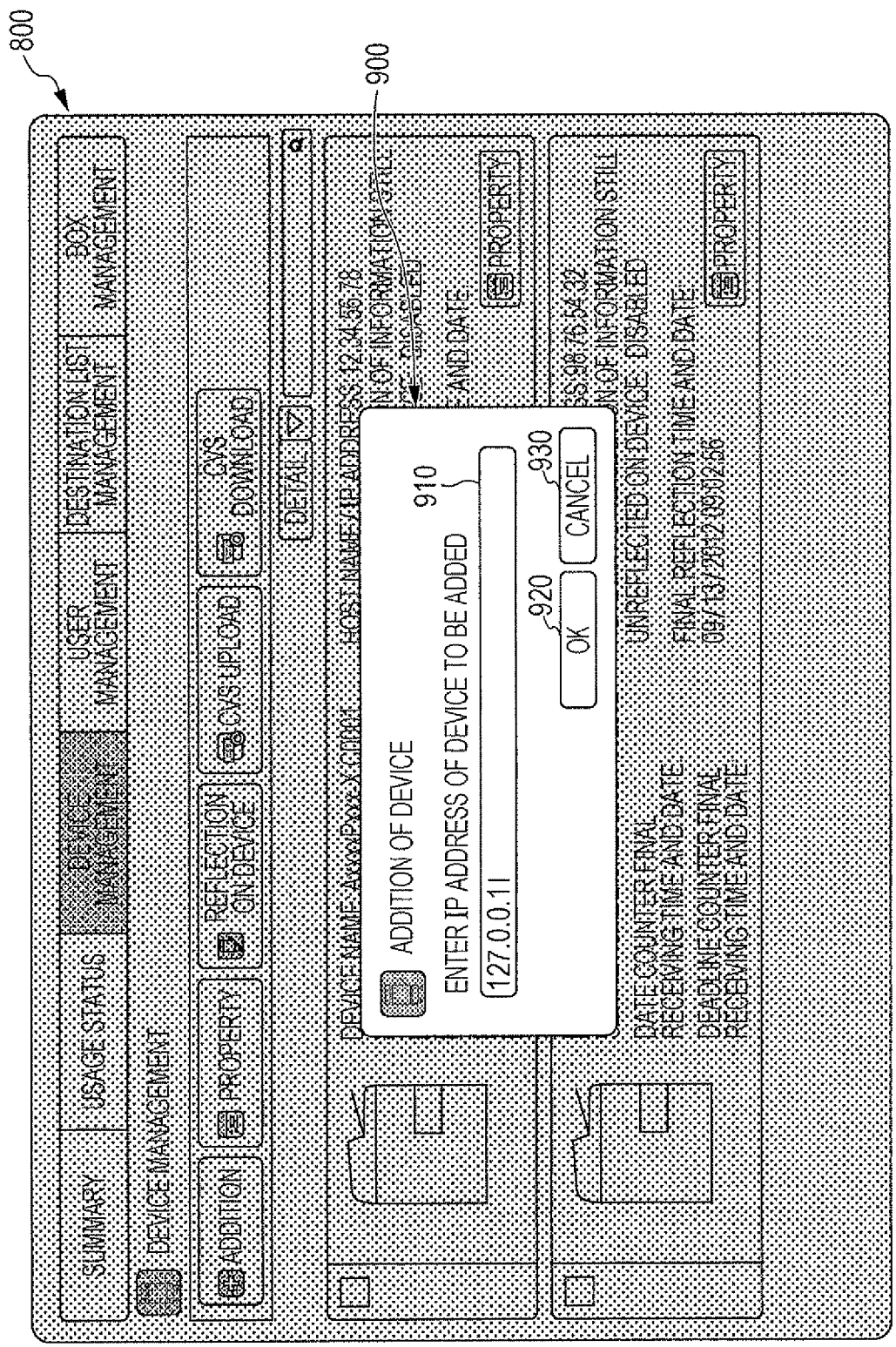
FIG. 9 illustrates a display example of a device addition screen.

In step S306, the device registration instructing module 164 gives a device registration instruction. The operator 280 selects (clicks on) the addition button 822 in order to add a new device 170 under the management of the Web service. When the addition button 822 is selected, a device addition screen 900 of FIG. 9 is displayed. Specifically, the device registering block 118 transmits to the configuration apparatus 160 information that is used to display the device addition screen 900. FIG. 9 illustrates a display example of the device addition screen 900. The configuration screen 800 is displayed in a fade-out state and is unable to receive any input. The device addition screen 900 includes an IP address box 910, an OK button 920, and a cancel button 930. An IP address of a device 170 to be registered is entered in the IP address box 910. The IP address to be entered is an IP address within the client site 250. In response to an operation of the operator 280, either the OK button 920 or the cancel 930 is selected. If the OK button 920 is selected, the device registering block 118 commences the process thereof (step S308 and subsequent steps) commences. If the cancel 930 is selected, the device registering block 118 does not perform the process thereof.

In step S308, the key generating module 122 generates the key information. Used as temporary key information is a universally unique identifier (UUID) as a general-purpose technique.

In step S310, the client ID associating module 124 associates the client ID with the key information. For example, the client ID associating module 124 generates the temporary key table 700 of FIG. 7 (the client ID column 710 and the temporary key column 720). In this way, the client ID associating module 124 associates (link) the client ID with the key information. FIG. 7 illustrates an example of the data structure of the temporary key table 700. The temporary key table 700 includes the client ID column 710, the temporary key column 720, and the expiration date column 730. The client ID column 710 stores the client ID. The temporary key column 720 stores the key information corresponding to that client ID. The expiration date column 730 stores the expiration date to be generated in next step S312.

In step S312, the expiration date attaching module 126 attaches the expiration date to the key information. The expiration date is set to be time and date (year, month, day, hours, minutes, seconds, and a decimal fraction of a second, or a combination thereof) at a predetermined period of time after the generation of the key information. For example, the expiration date is stored in the expiration date column 730 of the temporary key table 700 as illustrated in FIG. 7. Data as the expiration date is stored in the temporary key table 700 as illustrated in FIG. 10.

The issued key information may become unused for some reasons, such as a sudden closing of the Internet browser 265. In such a case, the expiration date is intended to control the remaining of invalid key information in the database. For example, the remaining of the invalid key information may be controlled by scanning the temporary key table 700 once a day, and deleting data, if expired (such as the key information expired), from the temporary key table 700.

In step S314, the transmission instruction generating module 128 generates a transmission instruction. The transmission instruction generating module 128 transmits in reply to the Internet browser 265 a Web page containing JavaScript to "issue a JSONP (general-purpose technique) with a temporary key attached to an input IP address". Device management using JSONP is disclosed in Japanese Unexamined Patent Application Publication No. 2009-237725.

In step S316, the communication module 150 transmits the transmission instruction to the configuration apparatus 160.

FIG. 11 is a flowchart illustrating a process example of the exemplary embodiment.

In step S1102, the configuration apparatus 160 receives the transmission instruction.

In the operation in step S316 of the flowchart of FIG. 3, the configuration apparatus 160 (the Internet browser 265 on the client PC 260) receives the Web page containing JavaScript.

In step S1104, the transfer module 166 transmits the transmission instruction to the device 170. The transfer module 166 executes JavaScript received in step S1102. For example, the transfer module 166 transmits to the device 170 a JSONP request of FIG. 12. More specifically, transmission information 1210 is transferred in a transmission direction 1200 from the client PC 260 to the device 270. In the transmission information 1210, cb represents a callback function name for response, and is a typical parameter in JSONP. SendKeyToCenter represents an instruction to execute a communication containing the key information and the serial number to the information processing apparatus 100. In the transmission information 1210, key=926ab57b-2b6f-4fed-9b53-f2bd23655267 represents the key information to be transmitted to the information processing apparatus 100 (information in the temporary key column 720 of the temporary key table 700 of FIG. 10).

Figure 12:
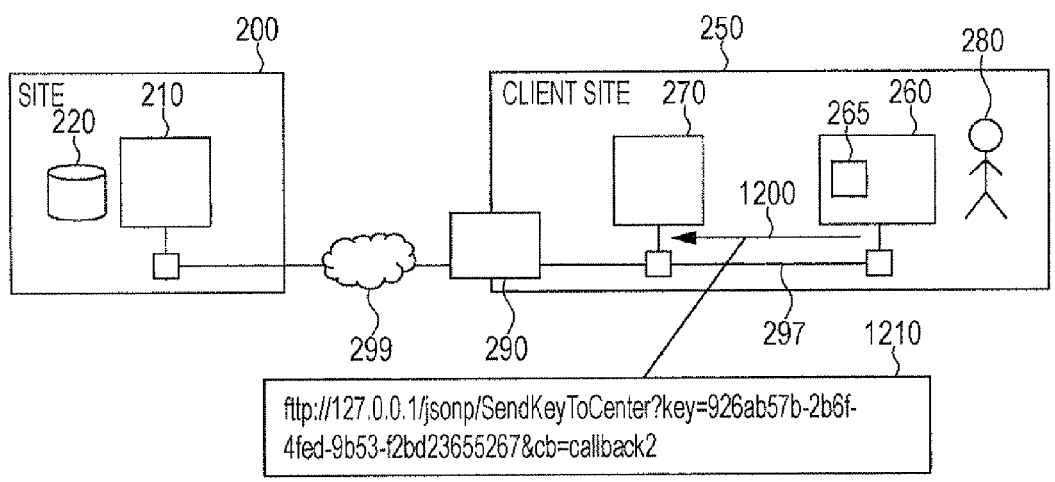
FIG. 12 illustrates the process example of the exemplary embodiment.

In step S1106, the device 170 receives the transmission instruction (the transmission information 1210 illustrated in FIG. 12).

Figure 13:
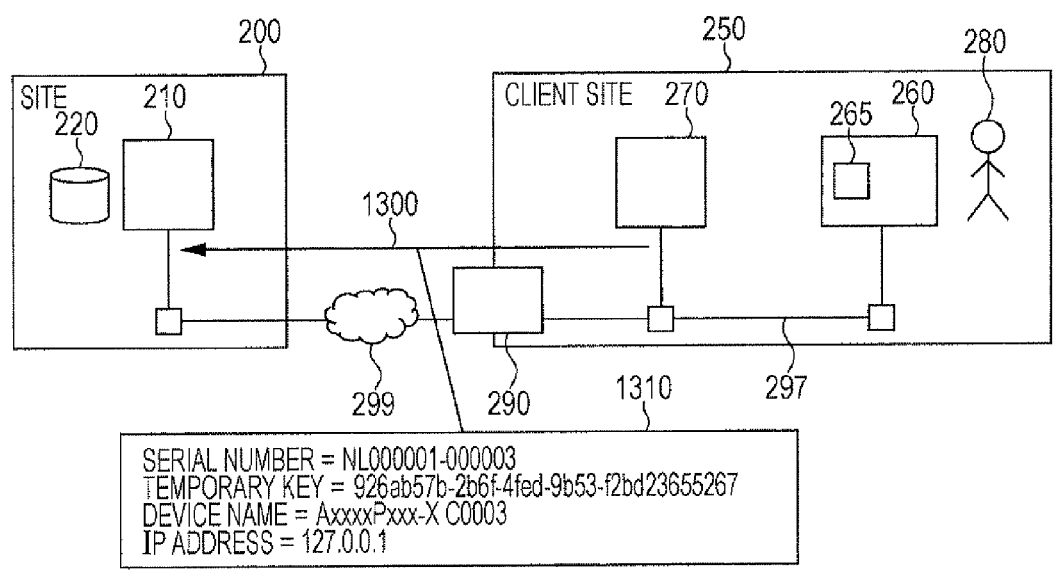
FIG. 13 illustrates a process example of the exemplary embodiment.

In step S1108, the device information notification module 174 transmits to the information processing apparatus 100 the serial number and the like of the device 170 together with the key information. Upon receiving the transmission information 1210 (the JSONP request) as illustrated in FIG. 12, for example, the device 270 performs communications with the center 210 as illustrated in FIG. 13. More specifically, the device 270 transmits transmission information 1310 to the center 210 (in a transmission direction 1300). Since the transmission is originated at the device 270, the transmission to the center 210 is possible. The transmission information 1310 includes at least the key information (temporary key=926ab57b-2b6f-4fed-9b53-f2bd23655267 in FIG. 13), and may further include the serial number, the device name, the IP address, and the like of the device 270.

In step S1110, the information processing apparatus 100 receives information related to a device to be registered. In the example of FIG. 13, the center 210 receives the transmission information 1310.

In step S1112, the expiration date checking module 134 checks the expiration date of the key information. If the key information is valid, processing proceeds to step S1114. If the key information is not valid, processing proceeds to step S1116. More specifically, the expiration date checking module 134 scans the temporary key table 700 of FIG. 10 to determine whether the key information is valid.

In step S1114, the device registering module 132 registers the information related to the device. By scanning the temporary key table 700, the device registering module 132 obtains a client ID (FFABCDE Company in this case). Since the association (link) between the client ID and the device is thus obtained, a new device 170 (NL000001-000003) is added under the service management of the client ID="FFABCDE Company". More specifically, the data is added to the device information table 600 of FIG. 6, resulting in the device information table 600 of FIG. 14. The added data is data extracted from the transmission information 1310.

In step S1116, the expiration date checking module 134 performs an error process. For example, the expiration date checking module 134 notifies the administrator that the key information expired.

In step S1118, the device registering module 132 deletes the key information from the temporary key table 700. Since the used key information becomes unnecessary, the used key information is deleted from the temporary key table 700. More specifically, the data is deleted from the temporary key table 700 of FIG. 10, and the temporary key table 700 of FIG. 15 results.

Figure 16:
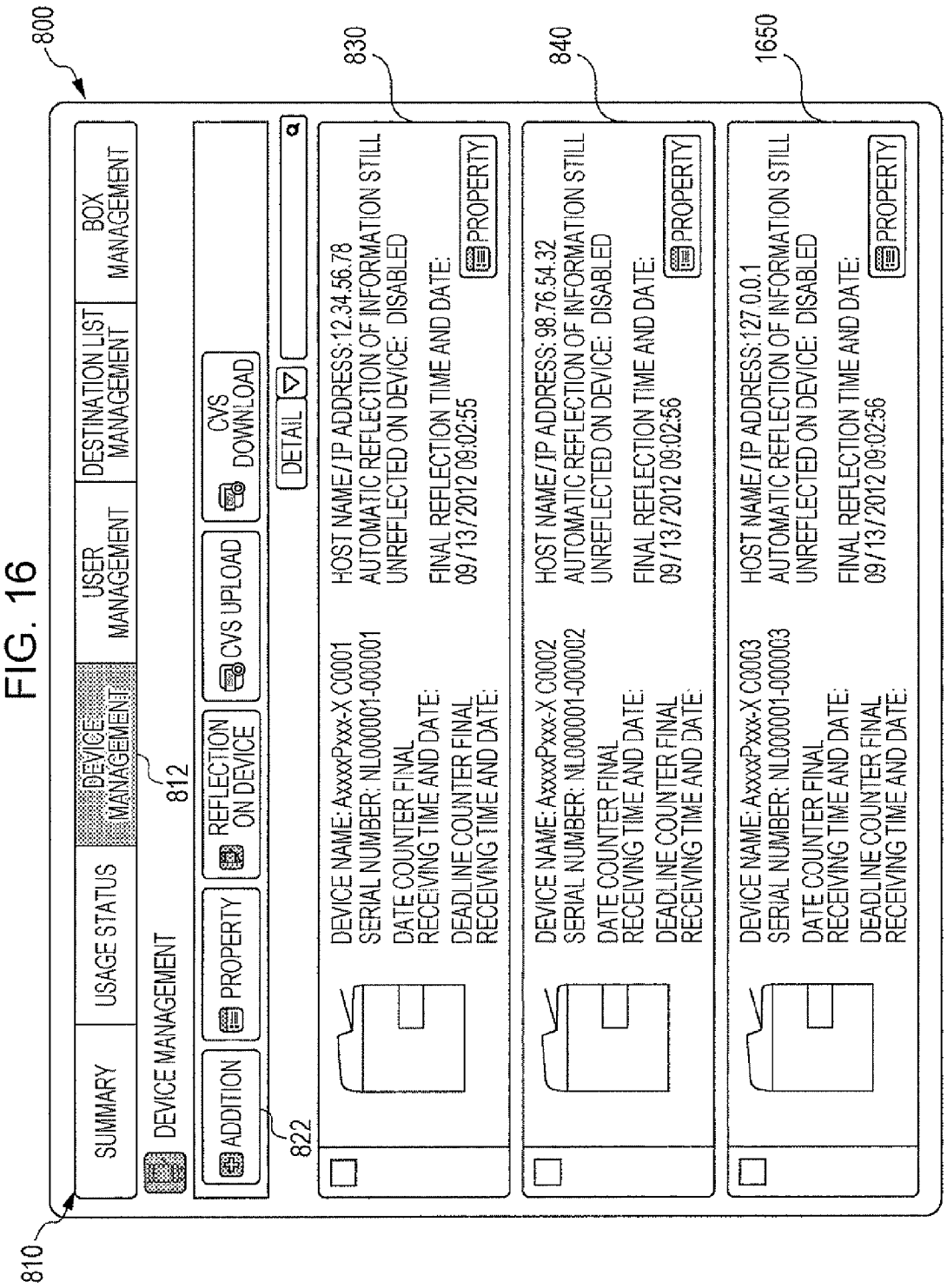
FIG. 16 illustrates a display example of the configuration screen.

If a display instruction is received from the device information display module 168 in the configuration apparatus 160 subsequent to the end of the registration process, the device information extracting module 114 in the information processing apparatus 100 displays a list of the devices 170 under the management of the service of the client ID="FFABCDE Company" derived from the device DB 116 (the device information table 600 of FIG. 14). The configuration screen 800 of FIG. 8 is updated to a configuration screen 800 of FIG. 16. This means that a device status information display partition 1650 is added to the configuration screen 800 of FIG. 8.

Figure 17:
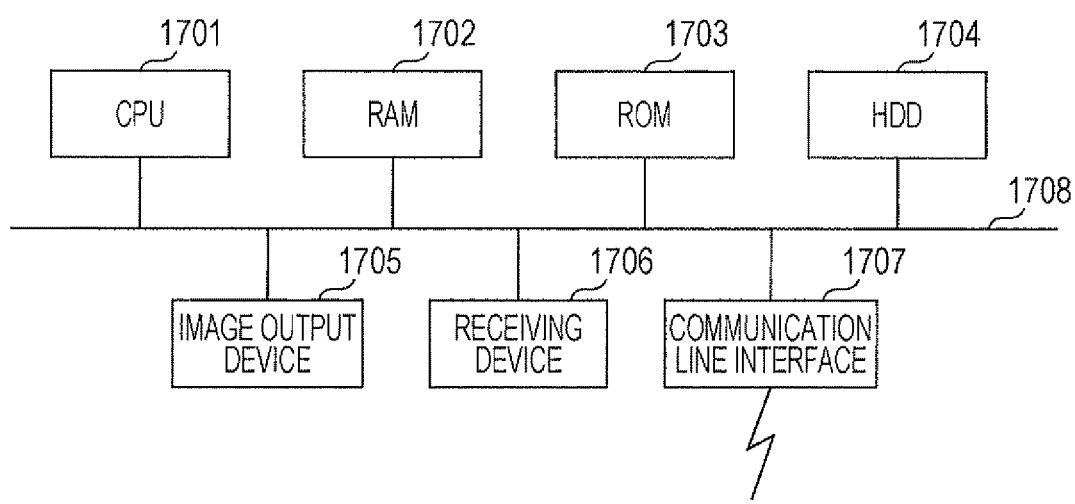
FIG. 17 is a block diagram illustrating a hardware configuration of a computer that implements the exemplary embodiment (including an information processing apparatus and a configuration apparatus)

A computer hardware configuration on which programs as the information processing apparatus 100 and the configuration apparatus 160 of the embodiment run is a standard computer as illustrated in FIG. 17. Specifically, the computer hardware configuration is a computer that may serve as a personal computer or a server. More specifically, a central processing unit (CPU) 1701 is used as a processor (arithmetic processor), and a random-access memory (RAM) 1702, a read-only memory (ROM) 1703, and a hard disk drive (HDD) 1704 are used as a storage device. A hard disk may be used for the HDD 1704. The computer includes a CPU 1701 that executes programs of the login process module 110, the device information extracting module 114, the device registering block 118, the device registration pre-process part 120, the key generating module 122, the client ID associating module 124, the expiration date attaching module 126, the transmission instruction generating module 128, the device registration process part 130, the device registering module 132, the expiration date checking module 134, the communication module 150, the communication module 162, the device registration instructing module 164, the transfer module 166, the device information display module 168, and other elements. The computer further includes a RAM 1702 that stores the programs and data, a ROM 1703 that stores a program to start up the computer and other programs, an HDD 1704 that is an auxiliary storage device having the functions of the account DB 112, the device DB 116, the key DB 136, and the like, a receiving device 1706 that receives data responsive to an operation that a user performs on a keyboard, a mouse, a touchpanel, and the like, an image output device 1705 such as a cathode ray tube (CRT) or a liquid-crystal display, a communication line interface 1707, such as a network interface card, for connection with a communication network, and a bus 1708 that interconnects these elements to exchange data thereamong. Multiple computers of this type may be interconnected to each other via a network.

A computer program of the exemplary embodiment may be read as software onto the system of the hardware configuration, and the exemplary embodiment is thus implemented with the software and hardware resources operating in concert.

The hardware configuration of FIG. 17 is discussed for exemplary purposes only. The exemplary embodiment is not limited to this hardware configuration of FIG. 17 and may be acceptable in any form as long as the modules of the exemplary embodiment are implemented. For example, some modules may be implemented using an application specific integrated circuit (ASIC) or the like. In another example, some modules may be in an external system and connected to the system of FIG. 17. In yet another example, plural systems of FIG. 17 may be interconnected to each other via a communication line such that the systems operate in concert with each other.

Figure 18:
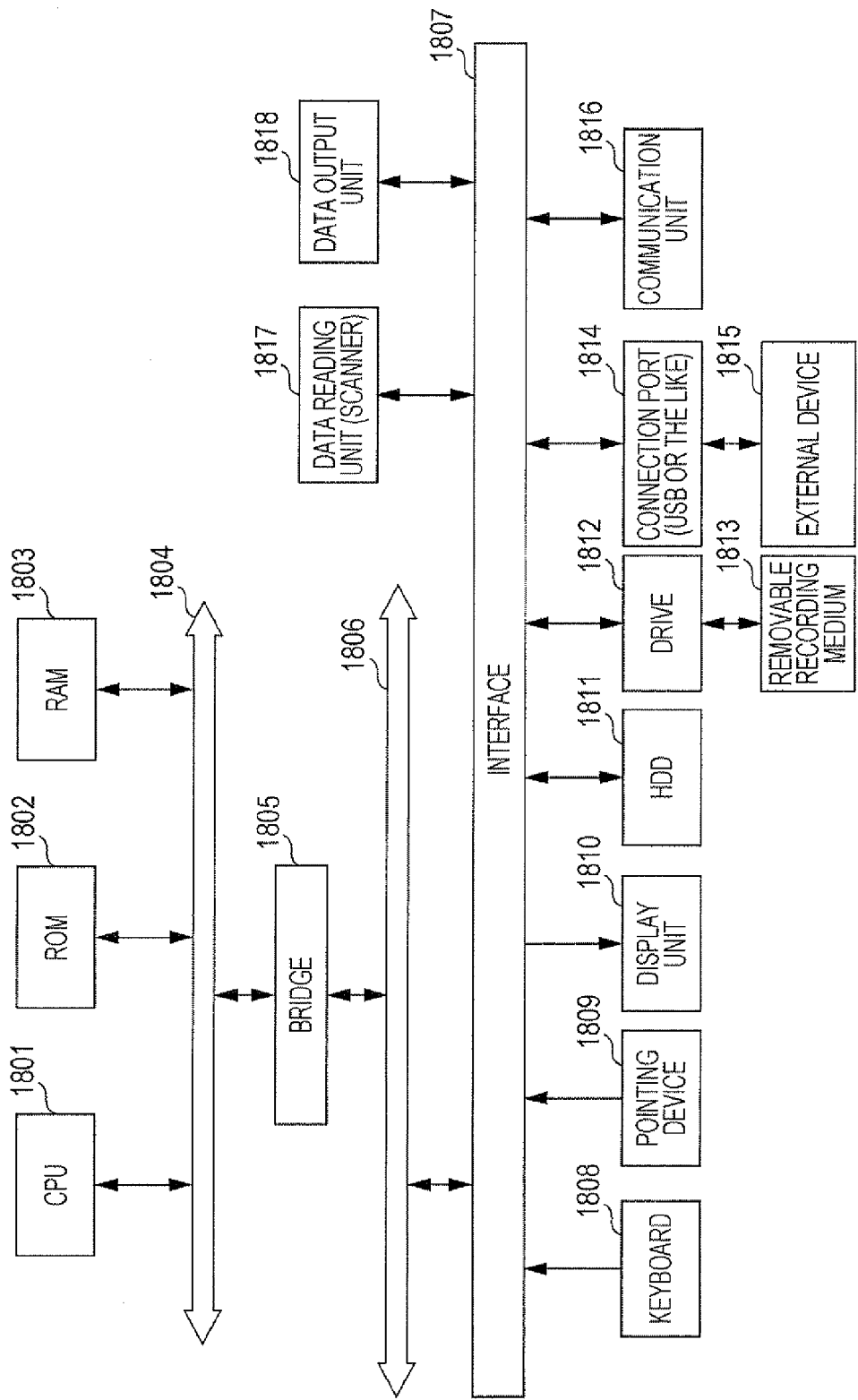
FIG. 18 is a block diagram illustrating a hardware configuration of a computer that implements the exemplary embodiment (a device).

A hardware configuration of an image processing apparatus as the device 170 of the exemplary embodiment is described below with reference to FIG. 18. The hardware configuration of FIG. 18 is a personal computer (PC), for example, and includes a data reading unit 1817 and a data output unit 1818.

A central processing unit (CPU) 1801 is a controller that performs a process in accordance with a computer program of an execution sequence of the variety of modules described above. The modules include the communication module 172, and the device information notification module 174.

A read-only memory (ROM) 1802 stores programs used by the CPU 1801, and arithmetic parameters. A random-access memory (RAM) 1803 stores the programs used by the CPU 1801 when the CPU 1801 operates, and parameters that vary as appropriate in the operation of the CPU 1801. These elements are interconnected via a host bus 1804 including a CPU bus.

The host bus 1804 is connected to an external bus 1806 such as a peripheral component interconnect/interface (PCI) bus via a bridge 1805.

A keyboard 1808, and a pointing device 1809 such as a mouse, are input devices operated by a user. A display 1810 includes a liquid-crystal display device or a cathode-ray tube (CRT), and displays a variety of information in the form of text or image information.

A hard disk drive (HDD) 1811 includes and drives a hard disk, and thus records and reproduces the program executed by the CPU 1801 and information. The hard disk stores configuration information. The hard disk further stores a variety of data processing programs and a variety of computer programs.

A drive 1812 reads data or programs stored on a loaded removable recording medium 1813 including a magnetic disk, an optical disk, a magneto-optical disk, a semiconductor memory or the like, and then transfers the data or the program to the connected RAM 1803 via an interface 1807, the external bus 1806, the bridge 1805, and the host bus 1804. The removable recording medium 1813 may be usable as a data recording region in the same manner as the hard disk.

A connection port 1814 connects to an external device 1815, and includes a connection part such as a universal serial bus (USB) connection, and an IEEE1394 connection. The connection port 1814 is connected to the CPU 1801 and the like via the interface 1807, the external bus 1806, the bridge 1805, the host bus 1804, and the like. A communication unit 1816 is connected to a communication network and performs a data communication process with the outside. The data reading unit 1817 may be a scanner, for example, and performs a document reading operation. The data output unit 1818 may be a printer, for example, and performs an output process of document data.

The hardware configuration of the information processing apparatus of FIG. 18 is discussed for exemplary purposes only. The exemplary embodiment is not limited to this hardware configuration of FIG. 18 and may be acceptable in any form as long as the modules of the exemplary embodiment are implemented. For example, some modules may be implemented using an application specific integrated circuit (ASIC) or the like. In another example, some modules may be in an external system and connected to the system. In yet another example, plural systems of FIG. 18 may be interconnected to each other via a communication network such that the systems operate in concert with each other.

The above-described program may be supplied in a stored state on a recording medium. The program may also be provided via communications. In such a case, the above-described program may be understood as an invention of a "non transitory computer readable recording medium storing the program."

The "non-transitory computer readable recording medium storing the program" refers to a computer readable recording medium storing the program, and is used to install the program, to execute the program, or to distribute the program.

The recording media include digital versatile disc (DVD), compact disc (CD), Blu-ray disc (registered trademark), magnetooptical disc (MO), flexible disc (FD), magnetic tape, hard disc, read-only memory (ROM), electronically erasable and programmable read-only memory (EEPROM (registered trademark)), flash memory, random-access memory (RAM), and secure digital (SD) memory card. The DVDs include "DVD-R, DVD-RW, and DVD-RAM" complying with the standard formulated by the DVD forum, and "DVD+R and DVD+RW" complying with DVD+RW standards. The CDs include read-only CD (CD-ROM), recordable CD-R, and rewritable CD-RW.

The program in whole or in part may be stored on the recording medium for storage and distribution. The program in whole or in part may be transmitted via a transfer medium. The transfer media include a wired network, a wireless network, or a combination thereof. The wired and wireless networks may include a local-area network (LAN), a metropolitan-area network (MAN), a wide-area network (WAN), the Internet, an Intranet, and an extranet. The program in whole or in part may be transmitted over a carrier wave.

The program may be part of another program, or may be stored on the recording medium together with another program. The program may be split and split programs may then be stored on the recording medium. The program may be processed in any fashion before being stored as long as the program remains restorable. For example, the program may be compressed or encrypted before storage.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A main information processing apparatus comprising: a hardware processor, the hardware processor being programmed to:
   receive a registration instruction to register a second information processing apparatus from a first information processing apparatus, the main information processing apparatus, the first information processing apparatus and the second information processing apparatus being different from each other;
   generate key information when the first receiving unit has received the registration instruction;
   associate, with the key information, registration instructing user identification information that identifies a user who has given the registration instruction;
   generate an instruction, to cause the second information processing apparatus to communicate with the main information processing apparatus, the instruction including the key information;
   transmit the instruction including the key information to the first information processing apparatus,
   wherein the first information processing apparatus transmits the instruction and the key information to the second information processing apparatus;
   receive the key information and information related to registration of the second information processing apparatus from the second information processing apparatus in response to the instruction transmitted to the first information processing apparatus;
   a memory that stores, in accordance with the key information received by the second receiving unit, the registration instructing user identification information in association with the information related to the registration of the second information apparatus received by the second receiving unit; and
   an attaching unit that attaches an expiration date of the key information to the key information,
   wherein upon determining that the key information is valid, the memory unit stores the information related to the registration of the second information apparatus.

2. The main information processing apparatus according to claim 1, wherein the first processing apparatus and the second processing apparatus are located inside a firewall, and
   wherein the main information processing apparatus is located outside the firewall.

3. The main information processing apparatus according to claim 1, wherein the first processing apparatus and the second processing apparatus are located inside a firewall, and
   wherein the main information processing apparatus is located outside the firewall.

4. A main information processing system comprising:
   the main information processing apparatus according to claim 1;
   a first information processing apparatus including a transmitting unit that transmits to the main information processing apparatus a registration instruction to register a second information processing apparatus, and a transfer unit that, upon receiving an instruction from the main information processing apparatus, transfers the instruction to the second information apparatus in response to the instruction; and
   the second information processing apparatus including a transmitting unit that receives an instruction from the first information processing apparatus, and then transmits, to the main information processing apparatus in accordance with the instruction, key information contained in the instruction and information related to registration of the second information processing apparatus.

5. An information processing method performed by a main information processing apparatus, the method comprising:
   receiving a registration instruction to register a second information processing apparatus from a first information processing apparatus, the main information processing apparatus, the first information processing apparatus and the second information processing apparatus being different from each other;
   generating key information if the registration instruction has been received;
   associating, with the key information, registration instructing user identification information that identifies a user who has given the registration instruction;
   generating an instruction, to cause the second information processing apparatus to communicate with the main information processing apparatus, the instruction including the key information;

transmitting the instruction including the key information to the first information processing apparatus,
wherein the first information processing apparatus transmits the instruction and the key information to the second information processing apparatus;
receiving the key information and information related to registration of the second information processing apparatus from the second information processing apparatus in response to the instruction transmitted to the first information processing apparatus;
storing, in accordance with the received key information, the registration instructing user identification information in association with the received information related to the registration of the second information apparatus;
attaching an expiration date of the key information to the key information, and
upon determining that the key information is valid, storing the information related to the registration of the second information apparatus.

6. A non-transitory computer readable medium storing a program causing a computer to execute a process of a main information processing apparatus for processing information, the process comprising:

receiving a registration instruction to register a second information processing apparatus from a first information processing apparatus, the main information processing apparatus, the first information processing apparatus and the second information processing apparatus being different from each other;
generating key information if the registration instruction has been received;
associating, with the key information, registration instructing user identification information that identifies a user who has given the registration instruction;
generating an instruction, to cause the second information processing apparatus to communicate with the main information processing apparatus, the instruction including the key information;
transmitting the instruction including the key information to the first information processing apparatus,
wherein the first information processing apparatus transmits the instruction and the key information to the second information processing apparatus;
receiving the key information and information related to registration of the second information processing apparatus from the second information processing apparatus in response to the instruction transmitted to the first information processing apparatus;
storing, in accordance with the received key information, the registration instructing user identification information in association with the received information related to the registration of the second information apparatus;
attaching an expiration date of the key information to the key information, and
upon determining that the key information is valid, storing the information related to the registration of the second information apparatus.

\* \* \* \* \*